United States Patent Office 3,838,130
Patented Sept. 24, 1974

3,838,130
$N^{10}$-OXIDES OF 1-NITRO-9-(DIALKYLAMINO-ALKYLAMINO)ACRIDINE
Andrzej Ledochowski, Gdansk, and Barbara Stefanska, Gdansk-Oliwa, Poland, assignors to Starogardzkie Zaklady Farmaceutyczne "Polfa," Starogard Gdanski, Poland
No Drawing. Original application Sept. 2, 1969, Ser. No. 854,608, now Patent No. 3,694,448, dated Sept. 26, 1972. Divided and this application Nov. 24, 1971, Ser. No. 201,946
Claims priority, application Poland, Aug. 31, 1968, P 128,855
Int. Cl. C07d 37/24
U.S. Cl. 260—279 A   2 Claims

ABSTRACT OF THE DISCLOSURE

The N-oxides of 1-nitro-9-(dialkylaminoalkylamino)-acridine which are antitumor agents are produced by oxidizing the corresponding $N^{10}$ or $N^{\omega}$ oxides.

CROSS REFERENCE TO RELATED APPLICATION

This application is a division of Ser. No. 854,608 filed Sept. 2, 1969, and issued as U.S. Pat. 3,694,448 on Sept. 26, 1972.

BACKGROUND OF THE INVENTION

The invention relates to novel acridine derivatives useful as antitumor agents.

DETAILED DESCRIPTION

The present invention is directed to new acridine derivatives, viz., the N-oxides of 1-nitro-9-(dialkylaminoalkylamino)acridine of the general formula:

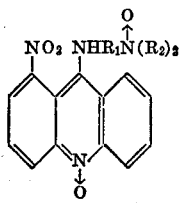

wherein $R_1$ is a straight or branched chain lower alkylene group and $R_2$ is a lower alkyl group, where the oxygen atoms may be added simultaneously to the nitrogen atoms in both the $N^{10}$ or $N^{\omega}$ positions or to only one of said nitrogen atoms.

$R_1$ may for instance be methylene, ethylene, propylene or butylene. Preferably it is propylene. $R_2$ may for instance be methyl, ethyl, or propyl and preferably is methyl.

These derivatives constitute a group of compounds exhibiting strong biological activity, in particular antitumor activity. As can be seen from the prior literature, these compounds were heretofore unknown and consequently the discovery of their antitumor properties is quite new.

For instance, the novel $N^{\omega}$-oxide, of 1-nitro-9-(3'-dimethylaminopropylamino) acridine, tested by means of the methods described below, and which are used for obtaining preliminary preclinical estimates of the value of new compounds, exhibits the following antitumor activity:

In vitro tests.—On growing a KB line tumorous tissue (human tumor), the above compound inhibits by 50% the albumin increase ($LD_{50}$) at a concentration of $10^{-7}$ g./ml.

In the Miyamura test the said compound shows a very strong activity—the inhibition zone of the dehydrogenase activity of Ehrlich carcinoma cells amounts to 22 mm. at a concentration of 1 mg./ml.

In vivo tests.—The growth of a Crocker 180 mouse sarcoma is inhibited by said compound by up to 40–60% when using doses of 2–4 mg./kg.

The present compounds are characterized by a lower toxicity, while maintaining at the same time the antitumor properties in relation to 1-nitro-9-(dialkylaminoalkylamino) acridine derivatives having no oxygen atoms added to the nitrogen atoms in position $N^{10}$ and/or $N^{\omega}$.

According to the invention, 1-nitro-9-(dialkylaminoalkylamino) acridine $N^{\omega}$-oxides are obtained by causing an oxidizing agent, preferably perbenzoic acid or perphthalic acid, in an organic solvent medium such as chloroform, etc., at a temperature of 5–30° C., to act upon 1-nitro-9-(dialkylaminoalkylamino)acridine.

Likewise according to the above method, by acting with the oxidizing agent at <5° C., $N^{10}$-oxides of 1-nitro-9-(dialkylaminoalkylamino)acridine are converted to $N^{10}$, $N^{\omega}$-dioxides of 1-nitro-9 - (dialkylaminoalkylamino)acridine. On the other hand, 1-nitro-9-(dialkylaminoalkylamino)acridine $N^{10}$-oxides according to the invention are obtainable by heating the N-oxides of 1-nitroacridine derivatives, having in the 9-position a chlorine atom, a phenoxy group of an alkoxy group, with a dialkylaminoalkylamine or the hydrochloride thereof, in a phenolic medium, at a temperature of 80–120° C. for 30–120 minutes.

It is also possible to use in the above condensation, the adduct of 1-nitro-9-chloroacridine N-oxide with pyridine. For this purpose, 1-nitro-9-chloroacridine N-oxide is heated with pyridine at the boiling point of pyridine or at a lower temperature, then the mixture is cooled and by adding ether, the pyridine adduct of 1-nitro-9-chloroacridine N-oxide is precipitated.

The starting 1-nitro-9-chloro-, phenoxy-, or alkoxyacridine N-oxides according to the present invention are obtained by causing an oxidizing agent, preferably perbenzoic or perphthalic acid, in an organic solvent medium such as chloroform, to act upon 1-nitro-9-chloro-, phenoxy- or alkoxyacridine. It is also possible to obtain the required 1-nitro-9-phenoxyacridine N-oxide from 1-nitro-9-chloroacridine N-oxide by treating same with phenol or sodium phenolate at a temperature of 80–120° C. for 30–120 minutes.

Example I

To a chloroform solution of 1.6 g. of 1-nitro-9-(3'-dimethylaminopropylamino)-acridine is added, at a temperature of <35° C., a chloroform solution of 0.8 g. of perbenzoic acid, whereupon the mixture is left for 18 hours at room temperature. Then the dihydrochloride of the $N^{\omega}$-oxide of 1-nitro-9-(3'dimethylaminopropylamino)-acridine is precipitated by adding an ether solution of hydrogen chloride thereto. Melting point 196° C., yield 85%.

Example II

To a chloroform solution of 1.65 g. of 1-nitro-9-(4'-dimethylaminobutylamino)-acridine is added, at a temperature of 35° C., a chloroform solution of 0.8 g. of perbenzoic acid and the mixture is left for 18 hours at room temperature. The addition of an ether solution of hydrogen chloride causes precipitation of the dihydrochloride of 1-nitro-9-(4'-dimethylaminobutylamino)acridine $N^{\omega}$-oxide having a melting point of 178° C. with decomposition in a yield of 60%.

Example III

To a chloroform solution of 1.7 g. of 1-nitro-9-(3'dimethyaminopropylamino)-acridine $N^{10}$, cooled to a temperature of 5° C., a chloroform solution of 8 g. of perbenzoic acid is added and the mixture is then left for 5 hours at a temperature of 5° C. The addition of an ether solution of hydrogen chloride causes precipitation of 1-nitro-9-(3'-dimethylaminopropylamino)-acridine di $N^{10}$, $N^\omega$-oxide dihydrochloride, having a melting point of 212° C. with decomposition in a yield of 45%.

Example IV 2.6 g. of 1-nitro-9-chloroacridine are dissolved in 10 ml. of chloroform and after adding 1.6 g. of perbenzoic acid in 30 ml. of chloroform, the mixture is left for 20 hours at room temperature, whereupon the solvent is distilled off in the presence of a platinum foil under reduced pressure. From the residue, by means of the addition of ether, a deposit is precipitated which is then subjected to crystallization from a benzene-cyclohexane mixture. 2.3 g. of 1-nitro-9-chloroacridine $N^{10}$-oxide with a melting point of 172–173° C. are obtained.

Example V 2.8 g. of 1-nitro-9-chloroacridine $N^{10}$-oxide for half an hour at a temperature of 80–90° C. with 1.3 g. of sodium phenolate in 10 g. of phenol. After cooling and pouring the mixture into a 2N sodium hydroxide solution, 1-nitro-9-phenoxyacridine $N^{10}$-oxide having a melting point of 207° C. in a yield of 85% is obtained.

Example VI 0.3 g. of 1-nitro-9-chloroacridine $N^{10}$-oxide is heated for 1 hour at a temperature of 120° C. with 3 g. of phenol. After isolation, as in Example V, 1-nitro-9-phenoxyacridine $N^{10}$-oxide in a yield of 70% is obtained.

Example VII

To a chloroform solution of 3.1 g. of 1-nitro-9-phenoxyacridine, a chloroform solution of 1.6 g. of perbenzoic acid is added and the mixture is left for 24 hours at room temperature. The chloroform solution is then washed with a 10% aqueous potassium carbonate solution and thereafter with water, whereupon it is dried and the chloroform is distilled off in the presence of a platinum foil under reduced pressure. The obtained deposit is purified by crystallization from a benzene-cyclohexane mixture. 1-nitro-9-phenoxyacridine $N^{10}$-oxide having a melting point of 207° C. is obtained.

Example VIII 1.4 g. of 1-nitro-9-chloroacridine N-oxide are heated with 10 ml. of pyridine for half an hour at a temperature of 80° C., whereupon, by means of ether, a deposit is precipitated which is washed with hot benzene. After crystallization from a methanol/ether mixture, a pyridine adduct of 1-nitro-9-chloroacridine $N^{10}$-oxide having a melting point of 210° C. in a yield of 70% is obtained.

Example IX 2.8 g. of 1-nitro-9-chloroacridine N-oxide are heated for 1 hour at a temperature of 120° C. with 10 g. of phenol, whereupon after 1.5 ml. of dimethylaminopropylamine have been added, the mixture is kept for half an hour at a temperature of 90° C. After cooling and pouring the mixture into an ether solution of hydrogen chloride, 1-nitro-9-(3' - dimethylaminopropylamino) - acridine $N^{10}$-oxide dihydrochloride having a melting point of 230° C. with decomposition, in a yield of 55% is obtained.

Example X 1.65 g. of 9-phenoxyacridine $N^{10}$-oxide and 0.75 ml. of dimethylaminopropylamine are heated for 40 minutes at a temperature of 90–100° C. with 8 g. of phenol. After cooling and isolation as in Example IX, 1-nitro-9-(3'-dimethylaminopropylamino)acridine $N^{10}$ - oxide dihydrochloride in a yield of 65% is obtained.

Example XI 1.8 g. of pyridine adduct of 1-nitro-9-chloroacridine $N^{10}$-oxide are heated with 10 g. of phenol for half an hour at a temperature of 120° C. and then after adding 0.6 g. of dimethylaminopropylamine dihydrochloride, the mixture continues to be heated for 1 hour at a temperature of 120° C. After cooling and pouring out into ether, the separated deposit is crystallized from a methanol/ether mixture. 1-nitro-9-(3'-dimethylaminopropylamino) acridine $N^{10}$-oxide dihydrochloride in a yield of 35% is obtained.

What is claimed is:

1. A compound of the formula

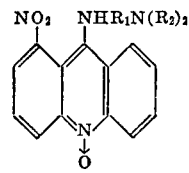

wherein $R_1$ is a straight or branched chain alkylene group having 1 to 4 carbon atoms, and $R_2$ is a lower alkyl group having 1 to 3 carbon atoms; and pharmaceutically acceptable acid addition salts of said compound.

2. A compound as claimed in claim 1 which is 1-Nitro-9-(3'-dimethylaminopropylamino)-acridine $N^{10}$-oxide and its dihydrochloride.

References Cited

UNITED STATES PATENTS

| | | | |
|---|---|---|---|
| 2,762,809 | 9/1956 | Steck | 260—279 A |
| 2,880,210 | 3/1959 | Elslager | 260—279 A |

FOREIGN PATENTS

| | | | |
|---|---|---|---|
| 1,093,847 | 12/1967 | Great Britain | 260—279 A |
| 799,361 | 8/1958 | Great Britain | 260—279 A |

OTHER REFERENCES

Ledchowsky et al., Chem. Abstr., Vol. 70, Col. 106357G (July 1969).

DONALD G. DAUS, Primary Examiner